A. LOOCK.
RESILIENT WHEEL.
APPLICATION FILED MAY 29, 1912.
1,035,367.
Patented Aug. 13, 1912.
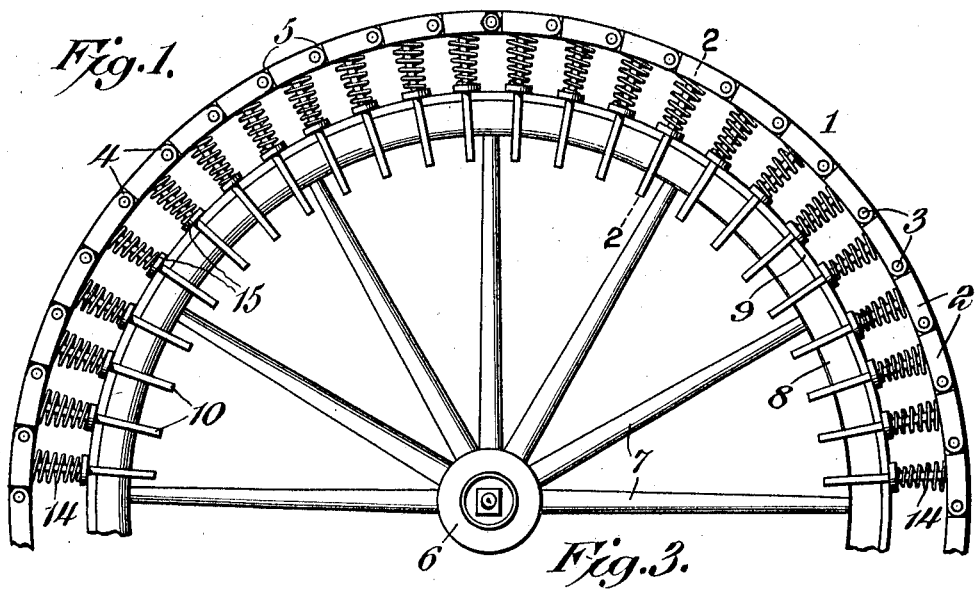
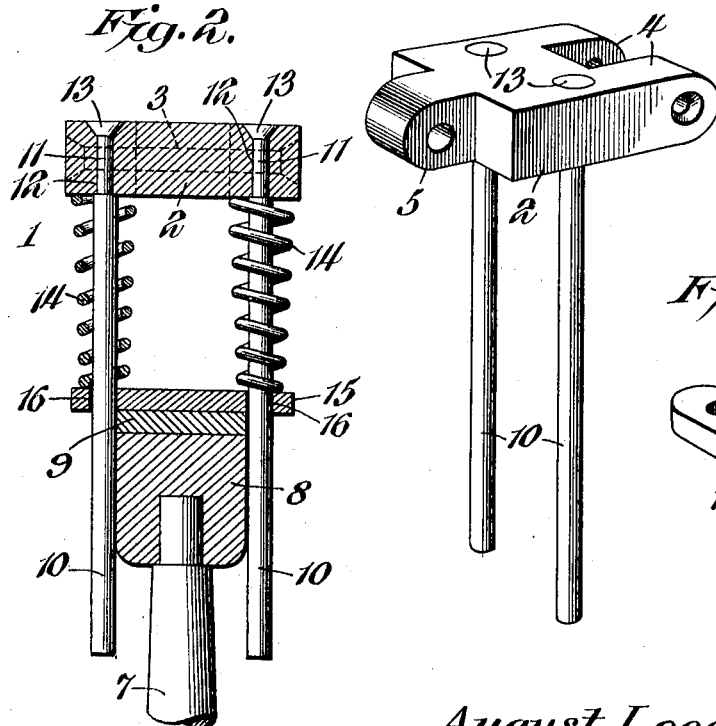
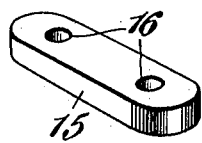
WITNESSES
August Loock, INVENTOR,
BY
ATTORNEY

UNITED STATES PATENT OFFICE.

AUGUST LOOCK, OF HAYFIELD, IOWA.

RESILIENT WHEEL.

1,035,367.  Specification of Letters Patent.  Patented Aug. 13, 1912.

Application filed May 29, 1912. Serial No. 700,500.

*To all whom it may concern:*

Be it known that I, AUGUST LOOCK, a citizen of the United States, residing at Hayfield, in the county of Hancock and State of Iowa, have invented a new and useful Resilient Wheel, of which the following is a specification.

The invention relates to improvements in resilient wheels.

The object of the present invention is to improve the construction of resilient wheels, and to provide a simple and inexpensive device of strong and durable construction adapted to be readily applied to an ordinary rigid wheel to convert the same into a resilient wheel, and designed for use on automobiles and other vehicles, and capable of affording the resiliency of a pneumatic tire.

With these and other objects in view, the invention consists in the construction and novel combination of parts hereinafter fully described, illustrated in the accompanying drawing, and pointed out in the claim hereto appended; it being understood that various changes in the form, proportion, size and minor details of construction, within the scope of the claim, may be resorted to without departing from the spirit or sacrificing any of the advantages of the invention.

In the drawing:—Figure 1 is a side elevation of a portion of a resilient wheel, constructed in accordance with this invention. Fig. 2 is an enlarged transverse sectional view on the line 2—2 of Fig. 1. Fig. 3 is a detail perspective view of one of the links of the flexible tire. Fig. 4 is a similar view of one of the guide plates.

Like numerals of reference designate corresponding parts in all the figures of the drawing.

In the accompanying drawing in which is illustrated the preferred embodiment of the invention, 1 designates a flexible tire consisting of a continuous chain composed of relatively short links 2, constructed of suitable metal and hinged or pivotally connected at their ends by transverse pins or rivets 3. The links, which are relatively short, may be substantially straight, as illustrated in the accompanying drawing; but in practice when the links are of any length, they will have a slight curvature so that the tire will present a smooth outer face or seat. Each link is bifurcated at one end to form spaced projecting portions 4, and it is provided at the other end with a central projecting portion 5, adapted to fit between the spaced projecting portions of the adjacent link. The transverse pins or rivets pass through perforations of the projecting portions 4 and 5, which are arranged in overlapped relation when the links of the chain or flexible tire are assembled.

The flexible chain is arranged concentric with and in spaced relation to the rim of an inner rigid wheel and is of greater diameter than the same. The inner rigid wheel, which may be of any preferred construction, is shown in the accompanying drawing as consisting of a hub 6, spokes 7 and a rim comprising a felly 8 and a tire 9.

The links 2 are provided at opposite sides with spaced radially arranged guide rods or pins 10, having reduced outer portions 11, which are secured in perforations 12 of the links preferably by heading the outer ends 13 of the rods or pins, but the latter may be connected with the links in any other desired manner. The spaced rods or pins 10, which are radially arranged, straddle the rim of the inner rigid wheel, and support coiled springs 14 and retain the resilient attachment on the rim of the inner rigid wheel. The guide rods or pins 10 are of sufficient length to permit the necessary play of the links incident to the cushioning action of the springs without becoming disengaged from the rim of the rigid wheel.

The coiled springs, which are arranged in pairs at the opposite sides of each of the links, are preferably tapered or conical, and they are interposed between the inner faces of the links 2 and transverse guide plates 15 seated against and extending across the rim of the wheel and projecting laterally beyond the same and provided in their projecting portions with guide openings 16 through which pass the guide rods or pins 10. The tension of the springs is sufficient to maintain the guide plates in position against the rim of the wheel, and it is unnecessary to fasten the guide plates to the said rim.

In assembling the parts the flexible chain may be laid out straight upon a suitable supporting surface with the pins projecting upwardly, and the springs may then be placed on the guide pins and the guide plates arranged in position upon the springs with the pins extending through the openings 16.

The wheel may then be placed upon one end of the tire between the spaced guide rods or pins and rolled along the same to permit the tire to be arranged around the periphery of the wheel, after which the terminals of the chain are connected together. In this manner it is possible to convert an ordinary rigid wheel into a resilient wheel without boring holes into the rim of the rigid wheel, or in any manner altering the construction thereof.

What is claimed is:—

The combination with a rigid wheel having a rim, of a flexible tire consisting of a chain arranged concentric with and spaced from the rim and composed of pivotally connected links, radial guide rods arranged in pairs and extending inwardly from opposite sides of the links and straddling the said rim, transversely disposed guide plates seated against the outer periphery of the rim and projecting laterally from the same and provided in their projecting portions with guiding openings receiving the said rods, and coiled springs disposed on the outer portions of the guide rods and interposed between the links and the guide plates and adapted to cushion the flexible tire.

In testimony, that I claim the foregoing as my own, I have hereto affixed my signature in the presence of two witnesses.

AUGUST LOOCK.

Witnesses:
R. E. HAPKL,
JOSEPH HORECKA.

---

Copies of this patent may be obtained for five cents each, by addressing the "Commissioner of Patents, Washington, D. C."